United States Patent
Chan et al.

(10) Patent No.: US 10,447,423 B2
(45) Date of Patent: Oct. 15, 2019

(54) BIDIRECTIONAL, MULTI-WAVELENGTH GIGABIT OPTICAL FIBER NETWORK

(71) Applicant: The Boeing Company, Chicago, IL (US)

(72) Inventors: Eric Y. Chan, Mercer Island, WA (US); Tuong K. Truong, Bellevue, WA (US); Dennis G. Koshinz, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/802,523

(22) Filed: Nov. 3, 2017

(65) Prior Publication Data

US 2019/0140761 A1    May 9, 2019

(51) Int. Cl.
| | |
|---|---|
| H04B 10/24 | (2006.01) |
| H04J 14/02 | (2006.01) |
| H04B 10/25 | (2013.01) |
| H04B 10/278 | (2013.01) |
| H04B 10/291 | (2013.01) |
| G02B 6/42 | (2006.01) |
| G02B 6/26 | (2006.01) |

(52) U.S. Cl.
CPC ........ *H04J 14/028* (2013.01); *H04B 10/2503* (2013.01); *H04B 10/278* (2013.01); *H04B 10/291* (2013.01); *H04J 14/0226* (2013.01); *H04J 14/0241* (2013.01); *G02B 6/26* (2013.01); *G02B 6/4246* (2013.01)

(58) Field of Classification Search
CPC ....... H04J 14/00; H04J 14/0216; H04J 14/028
See application file for complete search history.

(56) References Cited

U.S. PATENT DOCUMENTS

| | | | | |
|---|---|---|---|---|
| 4,164,364 A | * | 8/1979 | Witte ................... | G02B 6/2808 359/900 |
| 4,997,247 A | * | 3/1991 | Stowe .................. | G02B 6/2835 385/28 |

(Continued)

FOREIGN PATENT DOCUMENTS

| | | |
|---|---|---|
| EP | 2091166 A1 | 8/2009 |
| WO | 2009035202 A1 | 3/2009 |

OTHER PUBLICATIONS

Extended European Search Report dated Apr. 9, 2019 in European Patent Application No. 18202791.2 (European counterpart of the instant patent application).

*Primary Examiner* — David C Payne
*Assistant Examiner* — Pranesh K Barua
(74) *Attorney, Agent, or Firm* — Ostrager Chong Flaherty & Broitman P.C.

(57) ABSTRACT

A bidirectional, multi-wavelength fiber optical network that enables communication between electrical components (such as line replaceable units) at high data transmission rates. The proposed fiber optical network in accordance with some embodiments comprises a single plastic or glass optical fiber capable of transmitting data at rates faster than 1 Gbits/sec. In accordance with some embodiments, the number of fiber cables between line replaceable units onboard an airplane can be reduced by a factor of eight or more by substituting one gigabit plastic or gigabit glass optical fiber for four or more plastic or glass optical fibers.

17 Claims, 8 Drawing Sheets

(56) References Cited

U.S. PATENT DOCUMENTS

| | | | | |
|---|---|---|---|---|
| 5,109,447 | A * | 4/1992 | Chan | G01D 5/268 250/226 |
| 5,222,166 | A * | 6/1993 | Weltha | H04Q 11/0062 385/16 |
| 5,963,349 | A * | 10/1999 | Norte | H04B 10/40 398/1 |
| 6,546,160 | B1 | 4/2003 | Schunk | H04B 10/40 385/14 |
| 7,171,081 | B1 * | 1/2007 | Ko | G02B 6/29361 385/31 |
| 7,359,592 | B2 | 5/2008 | Truong | |
| 7,693,367 | B2 * | 4/2010 | Nakai | G02B 6/2835 385/28 |
| 7,965,913 | B2 | 6/2011 | Chan et al. | |
| 8,306,421 | B1 * | 11/2012 | Mazuk | H04B 10/272 398/168 |
| 8,554,032 | B2 | 10/2013 | Koshinz et al. | |
| 9,014,224 | B2 * | 4/2015 | O'Shaughnessy | G01N 21/255 372/34 |
| 9,209,901 | B2 * | 12/2015 | Dahlfort | H04B 10/03 |
| 9,297,970 | B1 | 3/2016 | Chan et al. | |
| 2002/0090172 | A1 * | 7/2002 | Okazaki | G02B 6/4204 385/27 |
| 2004/0175077 | A1 * | 9/2004 | Weber | H04J 14/02 385/88 |
| 2005/0041971 | A1 * | 2/2005 | Lee | H04B 10/2503 398/72 |
| 2005/0047785 | A1 * | 3/2005 | Hwang | G02B 6/4246 398/72 |
| 2005/0063653 | A1 * | 3/2005 | Matthijse | G02B 6/0288 385/123 |
| 2005/0226618 | A1 * | 10/2005 | Lange | H04J 14/02 398/79 |
| 2005/0226638 | A1 * | 10/2005 | Nesset | H04B 10/506 398/188 |
| 2005/0254822 | A1 * | 11/2005 | Duncan | G02B 6/4246 398/139 |
| 2006/0291776 | A1 * | 12/2006 | Lee | H04J 14/02 385/24 |
| 2007/0177879 | A1 * | 8/2007 | Hsieh | H04B 10/40 398/151 |
| 2009/0202204 | A1 * | 8/2009 | Nielsen | G02B 6/2551 385/43 |
| 2010/0226649 | A1 * | 9/2010 | Cheng | H04J 14/0209 398/72 |
| 2011/0052189 | A1 * | 3/2011 | Yamada | H04J 14/0279 14/279 |
| 2011/0243566 | A1 * | 10/2011 | Truong | H04B 10/40 398/116 |
| 2011/0274435 | A1 * | 11/2011 | Fini | G02B 6/02042 398/139 |
| 2012/0050191 | A1 * | 3/2012 | Higashida | H04B 10/272 345/173 |
| 2013/0077967 | A1 * | 3/2013 | Woodward | H04J 14/04 398/44 |
| 2013/0148963 | A1 * | 6/2013 | Cvijetic | H04J 14/04 398/45 |
| 2013/0302029 | A1 * | 11/2013 | Lee | H04B 10/07 398/25 |
| 2014/0270778 | A1 | 9/2014 | Hui et al. | |
| 2015/0036974 | A1 * | 2/2015 | Chan | G02B 6/2808 385/24 |
| 2015/0037046 | A1 * | 2/2015 | Chan | G02B 6/2808 398/175 |
| 2015/0229095 | A1 * | 8/2015 | Miyato | H01S 3/094003 372/6 |
| 2016/0085027 | A1 | 3/2016 | Chan et al. | |
| 2016/0173223 | A1 * | 6/2016 | Rosenfelder | H04J 14/0256 398/48 |
| 2017/0244478 | A1 * | 8/2017 | Weiner | H04L 29/00 |
| 2017/0279538 | A1 * | 9/2017 | Sone | H04B 10/2575 |
| 2017/0331549 | A1 * | 11/2017 | Molin | H04B 10/0731 |

* cited by examiner

BIDIRECTIONAL, MULTI-WAVELENGTH GIGABIT OPTICAL FIBER NETWORK

BACKGROUND

The technology disclosed herein generally relates to fiber optical networks that enable communication between electrical components.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. Optical fibers can be made of glass or plastic.

Optical networking using plastic optical fiber (POF) has advantages over copper wiring in weight, size, bandwidth, power, and electromagnetic immunity. POF has advantages over glass optical fiber (GOF) in ease of handling, installation and maintenance. POF core material can range from acrylate to perfluorinated polymer. POF index profile can range from step index to graded index. POF geometry can range from single core to multi-core. POF core can accommodate single mode (a single optical path in a very small fiber core) to multi-mode (multiple optical paths in a larger fiber core). Using POF may result in appreciable weight savings. The weight savings may be significant for networks onboard vehicles, such as airplanes, where the weight savings may result in reduced fuel consumption and lower emissions.

It is common practice to connect a number of line replaceable units (LRUs) to each other to achieve communication within an avionics system. For example, a number of LRUs in the forward section of a vehicle (e.g., an airplane) have been connected to a number of LRUs in the aft section of the vehicle. Connecting each LRU to every other LRU could result in an unreasonably large number of connections. Additionally, many of the connections between LRUs may be long, resulting in optical losses.

Fiber optic networks have the advantages of higher speed, lower weight and electromagnetic interference immunity over copper networks. Many models of commercial airplanes have fiber optic networks for size, weight and power reduction. In some cases the large number of glass optical fiber (GOF) cables in the airplane is an important factor contributing to high manufacturing cost. To reduce the cost for installing fiber optic network in airplane, there is a need to reduce the number of fiber optic cables used in the airplanes.

A typical solution to reduce fiber count is to use a wavelength division multiplexing (WDM) system. However, typical WDM systems are not compatible with multi-mode optical fiber currently used onboard commercial transport aircraft. Typical WDM components are designed for use with single-mode fiber. Single-mode fiber has a diameter smaller than 10 microns and therefore is very sensitive to dust, contamination, and misalignment from airplane vibration and shock. WDM components such as multiplexing and demultiplexing array waveguide gratings (AWG) are expensive and not proven for use in harsh avionic environments.

SUMMARY

The subject matter disclosed in some detail below is directed to a bidirectional, multi-wavelength fiber optical network that enables communication between electrical components (such as line replaceable units) at high data transmission rates (e.g., greater than 1 Gbits/sec). The proposed fiber optical network in accordance with some embodiments comprises a single optical fiber (plastic or glass) capable of transmitting data at rates faster than 1 Gbits/sec. Such a plastic optical fiber will be referred to herein as a "gigabit plastic optical fiber" (GbPOF). Gigabit plastic optical fiber is made of ductile perfluorinated polymer and it does not break during tight cable bending. One example GbPOF has a 55-micron core diameter and a 500-micron cladding diameter. The above-mentioned glass optical fiber will be referred to herein as a "gigabit glass optical fiber" (GbGOF). One example of a GbGOF is the OM4 multimode glass optical fiber with a 50-micron core diameter and a 125-micron cladding diameter. This GbGOF has bandwidth for 10 Gbits/sec over distances up to 400 meters.

In contrast to a pure silica GOF core, a multi-mode GbPOF with the same core diameter is more imperfect with long random polymer chains in spaghetti shapes. These polymer chains create strong forward mode coupling and result in less reflected light that can interfere with the laser source. The strong mode coupling in a POF core also reduces the coherency of the laser source and results in minimal modal interference along the fiber length. The optical network proposed herein solves the problems of existing WDM systems.

In accordance with one embodiment, the proposed optical network comprises of the following elements and characteristics: (1) the laser source can be a single-mode distributed feedback laser, a multi-mode Fabry-Pérot laser, or a vertical cavity surface-emitting laser; (2) multiple wavelengths flowing bidirectionally and simultaneously with each wavelength serve a separate communication function, e.g., control data, sensing data, health status data, configuration data, etc.; (3) a single-fiber multi-mode GbPOF or GbGOF link; (4) high-directional and mode-independent GOF couplers between multiple laser sources and the single-fiber GbPOF or GbGOF link; (5) angle/polished connectors between the GOF couplers and the GbPOF or GbGOF link; and (6) angle/polished connectors are not required for connecting segments along the GbPOF or GbGOF link, i.e., flat polish is sufficient. In accordance with some embodiments, the number of fiber cables extending from the forward section to the aft section of the airplane can be reduced by a factor of eight or more by substituting one GbPOF or GbGOF for eight or more POF or GOF.

In accordance with one embodiment, the optical network proposed herein reduces multiple fiber optic links to a single GbPOF or GbGOF link for full-duplex or half-duplex bidirectional data communication between multiple LRUs onboard the airplane.

In accordance with a preferred embodiment, the optical network uses low-cost, high-performance small form factor pluggable (SFP) bidirectional optical transceivers at the wavelength ranges where the optical losses of the GbPOF are very low if not minimal. In addition, the optical network proposed herein uses GOF couplers having low optical reflection to reduce the optical signal reflected from the adjacent bidirectional transceiver. Ultra-low-reflection (or high optical return loss) connectors are used to connect the GbPOF to the outputs of the GOF couplers.

Although various embodiments of a bidirectional fiber optical network that transmits and receives light of multiple wavelengths by way of a single gigabit plastic or gigabit glass optical fiber for use in the avionics system of an airplane will be described in some detail below, one or more of those embodiments may be characterized by one or more of the following aspects.

One aspect of the subject matter disclosed in detail below is a data transmission system comprising: an optical cable comprising a gigabit optical fiber; and first through fourth transceivers each comprising an optical filter, a laser disposed to transmit light through the optical filter, and a photodetector disposed to receive light reflected by the optical filter, wherein: the laser and photodetector of the first transceiver are respectively optically coupled to the photodetector and laser of the second transceiver, and the laser and photodetector of the third transceiver are respectively optically coupled to the photodetector and laser of the fourth transceiver by way of the gigabit optical fiber; the laser of the first transceiver emits light having a first wavelength, the laser of the second transceiver emits light having a second wavelength, the laser of the third transceiver emits light having a third wavelength, and the laser of the fourth transceiver emits light having a fourth wavelength; and the optical filter of the first and second transceivers passes light having the first wavelength and reflects light having the second wavelength, and the optical filter of the third and fourth transceivers passes light having the third wavelength and reflects light having the fourth wavelength. The data transmission system described in the preceding paragraph may further comprise: fifth through eighth transceivers each comprising an optical filter, a laser disposed to transmit light through the optical filter, and a photodetector disposed to receive light reflected by the optical filter, wherein: the laser and photodetector of the fifth transceiver are respectively optically coupled to the photodetector and laser of the sixth transceiver, and the laser and photodetector of the seventh transceiver are respectively optically coupled to the photodetector and laser of the eighth transceiver by way of the gigabit optical fiber; the laser of the fifth transceiver emits light having a fifth wavelength, the laser of the sixth transceiver emits light having a sixth wavelength, the laser of the seventh transceiver emits light having a seventh wavelength, and the laser of the eighth transceiver emits light having an eighth wavelength; and the optical filter of the fifth and sixth transceivers passes light having the fifth wavelength and reflects light having the sixth wavelength, and the optical filter of the seventh and eighth transceivers passes light having the seventh wavelength and reflects light having the eighth wavelength. This data transmission system further comprises: a first glass optical fiber coupler that optically couples the laser and photodetector of each of the first, third, fifth and seventh transceivers to one end of the gigabit optical fiber; and a second glass optical fiber coupler that optically couples the laser and photodetector of each of the second, fourth, sixth and eighth transceivers to another end of the gigabit optical fiber.

In accordance with various embodiments, the first through eighth wavelengths are in a wavelength range from 750 to 1600 nm. In accordance with one proposed implementation, the first wavelength is 1270 nm, the second wavelength is 1330 nm, the third wavelength is 850 nm, the fourth wavelength is 880 nm, the fifth wavelength is 780 nm, the sixth wavelength is 980 nm, the seventh wavelength is 1200 nm and the eighth wavelength is 1230 nm. In accordance with one embodiment of the system described in the preceding paragraphs, each optical filter of the first through eighth transceivers is a wavelength-selective bandpass filter, and each of the first through eighth transceivers is a dual-wavelength single-fiber bidirectional transceiver.

Another aspect of the subject matter disclosed in detail below is a method for enabling bidirectional full-duplex data transmission between first and second sets of line replaceable units, comprising: (a) equipping each line replaceable unit with a dual-wavelength single-fiber bidirectional transceiver; (b) optically coupling single fibers of the dual-wavelength single-fiber bidirectional transceivers of the first set of line replaceable units to one end of an optical cable that comprises a gigabit optical fiber; and (c) optically coupling single fibers of the dual-wavelength single-fiber bidirectional transceivers of the second set of line replaceable units to another end of the optical cable, wherein the first set of line replaceable units includes at least two line replaceable units, and the number of line replaceable units in the second set is the same as the number of line replaceable units in the first set.

In accordance with one embodiment of the foregoing method, the single fibers are made of glass and step (b) comprises: coupling the single fibers of the dual-wavelength single-fiber bidirectional transceivers of the first set of line replaceable units into a first glass optical fiber; and connecting one end of the first glass optical fiber to one end of the gigabit optical fiber. In addition, the first set of line replaceable units comprises a first line replaceable unit, the second set of line replaceable units comprises a second line replaceable unit, and step (a) comprises: equipping the first line replaceable unit with a first dual-wavelength single-fiber bidirectional transceiver that emits light having a first wavelength and detects light having a second wavelength; and equipping the second line replaceable unit with a second dual-wavelength single-fiber bidirectional transceiver that emits light having the second wavelength and detects light having the first wavelength.

A further aspect of the subject matter disclosed in detail below is a data communications system, comprising: first and second pluralities of electrical devices configured for sending and receiving electrical signals representing data; a first plurality of dual-wavelength single-fiber bidirectional transceivers, each dual-wavelength single-fiber bidirectional transceiver of the first plurality comprising a respective transmit circuit that converts electrical signals received from a respective one of the first plurality of electrical devices into optical signals and a respective receive circuit that converts optical signals into electrical signals to be sent to the respective one of the first plurality of electrical devices; a second plurality of dual-wavelength single-fiber bidirectional transceiver, each dual-wavelength single-fiber bidirectional transceiver of the second plurality comprising a respective transmit circuit that converts electrical signals received from a respective one of the second plurality of electrical devices into optical signals and a respective receive circuit that converts optical signals into electrical signals to be sent to the respective one of the second plurality of electrical devices; a first glass optical fiber coupler optically coupled to a single fiber of each of the first plurality of dual-wavelength single-fiber bidirectional transceivers; a second glass optical fiber coupler optically coupled to a single fiber of each of the second plurality of dual-wavelength single-fiber bidirectional transceivers; and an optical cable connecting the first glass optical fiber coupler to the second glass optical fiber coupler, wherein the optical cable comprises a gigabit optical fiber.

In accordance with one embodiment of the data communications system described in the preceding paragraph, the first plurality of electronic devices are line replaceable units located in a forward section of an airplane and the second plurality of electronic devices are line replaceable units located in an aft section of the airplane.

In accordance with one proposed implementation of the data communications system: a first dual-wavelength single-fiber bidirectional transceiver of the first plurality emits light having a first wavelength and detects light having a second wavelength; a second dual-wavelength single-fiber bidirectional transceiver of the second plurality emits light having the second wavelength and detects light having the first wavelength; a third dual-wavelength single-fiber bidirectional transceiver of the first plurality emits light having a third wavelength and detects light having a fourth wavelength; a fourth dual-wavelength single-fiber bidirectional transceiver of the second plurality emits light having the fourth wavelength and detects light having the third wavelength; a fifth dual-wavelength single-fiber bidirectional transceiver of the first plurality emits light having a fifth wavelength and detects light having a sixth wavelength; a sixth dual-wavelength single-fiber bidirectional transceiver of the second plurality emits light having the sixth wavelength and detects light having the fifth wavelength; a seventh dual-wavelength single-fiber bidirectional transceiver of the first plurality emits light having a seventh wavelength and detects light having an eighth wavelength; and an eighth dual-wavelength single-fiber bidirectional transceiver of the second plurality emits light having the eighth wavelength and detects light having the seventh wavelength, wherein the first through eighth wavelengths are different. In one example, the first wavelength is 1270 nm, the second wavelength is 1330 nm, the third wavelength is 850 nm, the fourth wavelength is 880 nm, the fifth wavelength is 780 nm, the sixth wavelength is 980 nm, the seventh wavelength is 1200 nm and the eighth wavelength is 1230 nm.

Other aspects of fiber optical networks for enabling optical communication at high data transmission rates are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of optical networks are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Various embodiments of a fiber optical network for enabling optical communication between line replaceable units on an airplane at high data transmission rates (e.g., greater than 1 Gbits/sec) will be described in detail below for the purpose of illustration. However, implementation of the fiber optical networks disclosed herein is not limited solely to the environment of an airplane, but rather may be utilized in fiber optical networks onboard other types of vehicles or other types of fiber optical networks (e.g., long-distance terrestrial, data center and fiber-to-the-home/office applications). In addition, although the particular example embodiment disclosed in some detail hereinafter employs a GbPOF, alternative embodiments may employ GbGOF.

Figure 1:
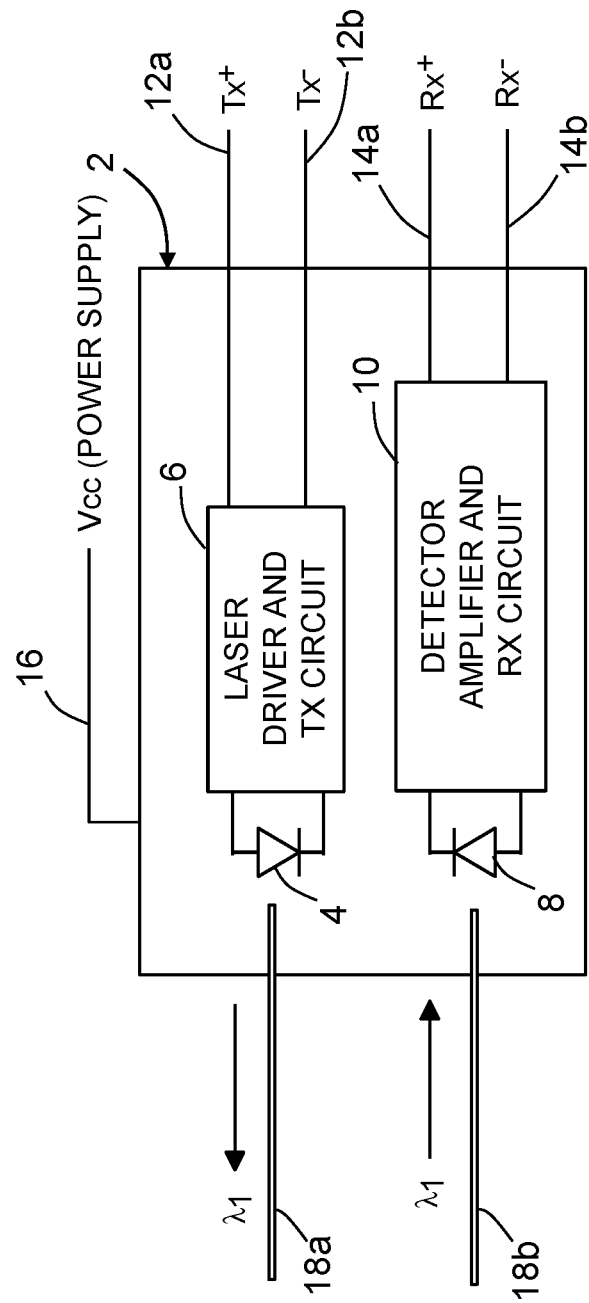
FIG. 1 is a diagram identifying some features of a dual-fiber bidirectional transceiver design in which the transceiver transmits and receives light of the same wavelength.

FIG. 1 is a diagram identifying some features of a dual-fiber bidirectional transceiver design in which the transceiver transmits and receives light of the same wavelength. [As used herein, the term "wavelength" in the context of coherent laser light means the center wavelength of laser light having a narrow bandwidth.] In this example, the transceiver is a single-wavelength dual-fiber bidirectional transceiver 2 comprising a laser 4 and a photodetector 8. The laser 4 is driven to emit light of a wavelength $\lambda_1$ by a laser driver and transmit circuit 6 in response to receipt of differential transmit signals Tx$^+$ and Tx$^-$ from an associated line replaceable unit (not shown) via transmit electrical signal lines 12a and 12b respectively. The laser driver and transmit circuit 6 comprises electrical circuitry that converts those electrical differential signals to electrical digital signals representing the data to be transmitted by the laser 4. Conversely, the photodetector 8 receives light of wavelength $\lambda_1$ and converts that detected light into electrical digital signals which are provided to a detector amplifier and receive circuit 10. The detector amplifier and receive circuit 10 in turn comprises electrical circuitry that converts those electrical digital signals to electrical differential receive signals Rx$^+$ and Rx$^-$ representing the data received. The electrical differential receive signals Rx$^+$ and Rx$^-$ are transmitted to other circuitry in the line replaceable unit via receive electrical signal lines 14a and 14b respectively. The single-wavelength dual-fiber bidirectional transceiver 2 receives electrical power having a voltage $V_{cc}$ via transceiver power supply line 16.

The laser 4 is optically coupled to a glass optical fiber 18a, while the photodetector 8 is optically coupled to a glass optical fiber 18b. Both glass optical fibers 18a and 18b typically have cores made of the same material having an index of refraction selected to minimize the optical loss for any light of wavelength $\lambda_1$ being transmitted along the length of the fiber.

Figure 2:
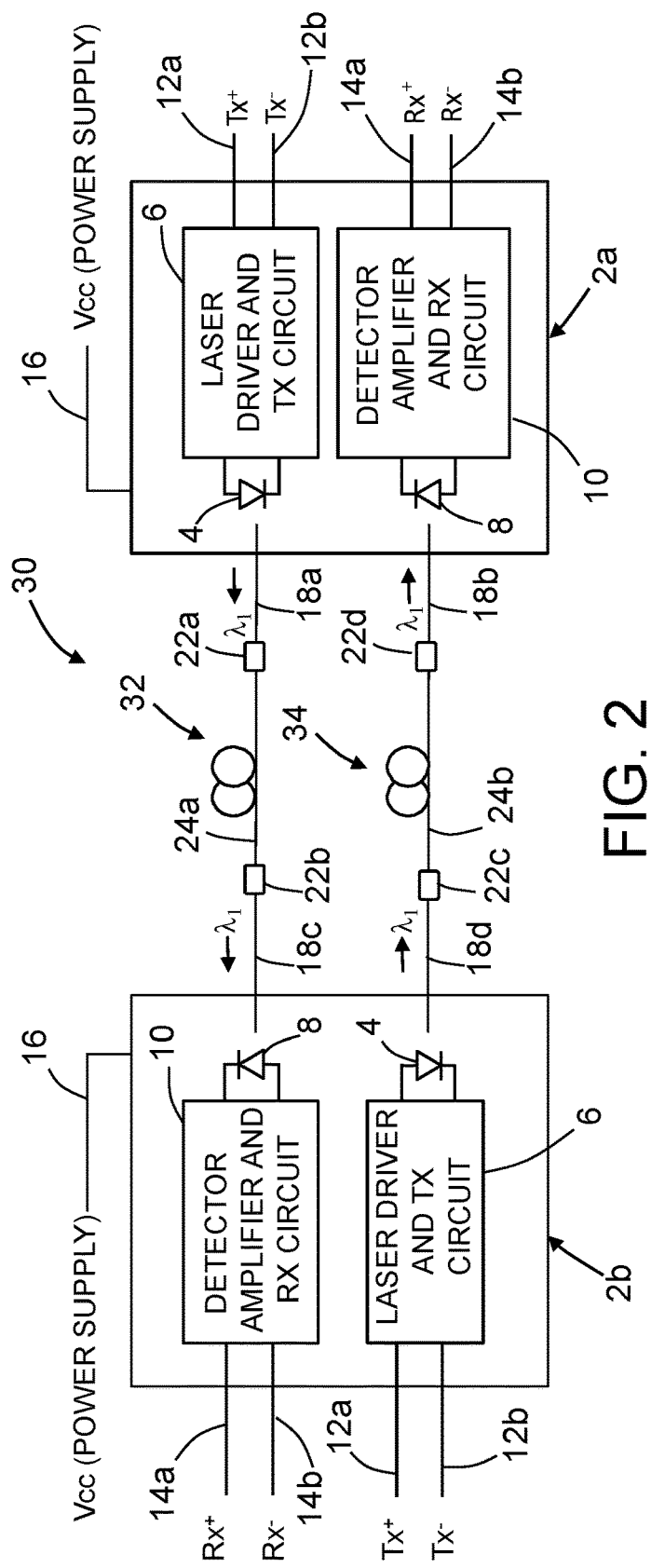
FIG. 2 is a diagram identifying some features of a bidirectional full-duplex data transmission system comprising one pair of dual-fiber bidirectional transceivers that each transmit and receive light of the same wavelength, each single-wavelength dual-fiber bidirectional transceiver being of the type depicted in FIG. 1.

FIG. 2 is a diagram identifying some features of a bidirectional full-duplex data transmission system 30 comprising one pair of dual-fiber bidirectional transceivers 2a and 2b that each transmit and receive light of the same wavelength, each of the single-wavelength dual-fiber bidirectional transceivers 2a and 2b having the same components as the components of the single-wavelength dual-fiber bidirectional transceiver 2 depicted in FIG. 1. In this example, the laser 4 of the single-wavelength dual-fiber bidirectional transceiver 2a is optically coupled to emit light toward the photodetector 8 of the single-wavelength dual-fiber bidirectional transceiver 2b via an optical cable 32 comprising a glass optical fiber 18a, a connector 22a, a gigabit plastic optical fiber 24a, a connector 22b and a glass optical fiber 18c connected in series. Similarly, the laser 4 of the single-wavelength dual-fiber bidirectional transceiver 2b is optically coupled to emit light toward to the photodetector 8 of the single-wavelength dual-fiber bidirectional transceiver 2a via an optical cable 34 comprising a glass optical fiber 18d, a connector 22c, a gigabit plastic optical fiber 24b, a connector 22d and a glass optical fiber 18b connected in series. Both single-wavelength dual-fiber bidirectional transceivers 2a and 2b transmit and receive light having a wavelength $\lambda_1$. The optical cables 32 and 34 may be identical in construction. The inclusion of gigabit plastic optical fibers 24a and 24b enables bidirectional full-duplex data transmission between single-wavelength dual-fiber bidirectional transceivers 2a and 2b at a high data rate (>1 Gbits/sec).

Figure 3:
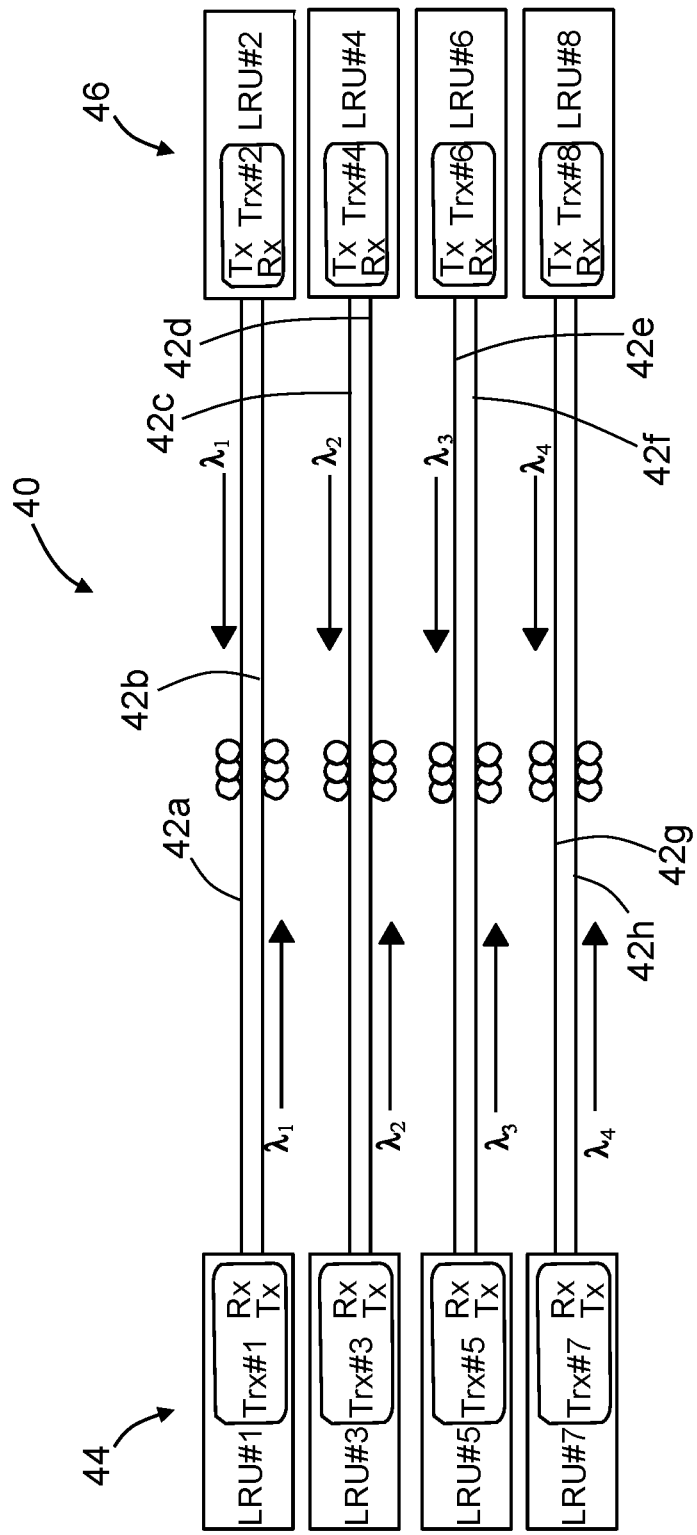
FIG. 3 is a diagram identifying components of a known bidirectional full-duplex data transmission system having eight full-duplex glass fiber optical cables optically coupling the single-wavelength dual-fiber bidirectional transceivers of one set of line replaceable units to the single-wavelength dual-fiber bidirectional transceivers of another set of line replaceable units.

FIG. 3 is a diagram identifying components of a known bidirectional full-duplex data transmission system 40 having eight full-duplex glass fiber optical cables 42a-42h optically coupling the transceivers of one set of line replaceable units 44 (hereinafter "LRU set 44") to the transceivers of another set of line replaceable units 46 (hereinafter "LRU set 46"). For example, LRU set 44 may be disposed in a forward section of an airplane while LRU set 46 is disposed in an aft section of the airplane. In this example, the LRU set 44 comprises four LRUs (respectively designated LRU#1, LRU#3, LRU#5 and LRU#7), whereas the LRU set 46 comprises four LRUs (respectively designated LRU#2, LRU#4, LRU#6 and LRU#8). Each of the eight LRUs incorporates a respective dual-fiber transceiver (respectively designated Trx#1 through Trx#8).

In this example, the LRU set 44 comprises four dual-fiber transceivers (respectively designated Trx#1, Trx#3, Trx#5 and Trx#7), whereas the LRU set 46 comprises four dual-fiber transceivers (respectively designated Trx#2, Trx#4, Trx#6 and Trx#8). The transceiver Trx#1 is optically coupled to the transceiver Trx#2 via glass optical fiber cables 42a and 42b to enable full-duplex communication between transceivers Trx#1 and Trx#2. Transceivers Trx#1 and Trx#2 are configured so that they transmit and receive light having a wavelength $\lambda_1$. The transceiver Trx#3 is optically coupled to the transceiver Trx#4 via glass optical fiber cables 42c and 42d to enable full-duplex communication between transceivers Trx#3 and Trx#4. Transceivers Trx#3 and Trx#4 are configured so that they transmit and receive light having a wavelength $\lambda_2$. The transceiver Trx#5 is optically coupled to the transceiver Trx#6 via glass optical fiber cables 42e and 42f to enable full-duplex communication between transceivers Trx#5 and Trx#6. Transceivers Trx#5 and Trx#6 are configured so that they transmit and receive light having a wavelength $\lambda_3$. The transceiver Trx#7 is optically coupled to the transceiver Trx#8 via glass optical fiber cables 42g and 42h to enable full-duplex communication between transceivers Trx#7 and Trx#8. Transceivers Trx#7 and Trx#8 are configured so that they transmit and receive light having a wavelength $\lambda_4$. Each of the dual-fiber transceivers is of the type depicted in FIG. 1. In the system shown in FIG. 3, wavelengths $\lambda_1$ to $\lambda_4$ can be different or equal to each other.

The bidirectional full-duplex data transmission system 40 depicted in FIG. 3 has eight full-duplex glass optical fiber cables 42a-42h cables to be routed inside the airplane's cable plant. To reduce the cost and labor related to this large number of glass optical fiber cables in the airplane, the technological improvement that is the subject of this disclosure provides the design for a fiber optical network which comprises a single gigabit plastic optical fiber cable for optical coupling one set of four bidirectional transceivers to another set of four bidirectional transceivers, thereby reducing the number of cables from eight to one single fiber optical cable running a length of the airplane from a front section to an aft section.

Figure 4:
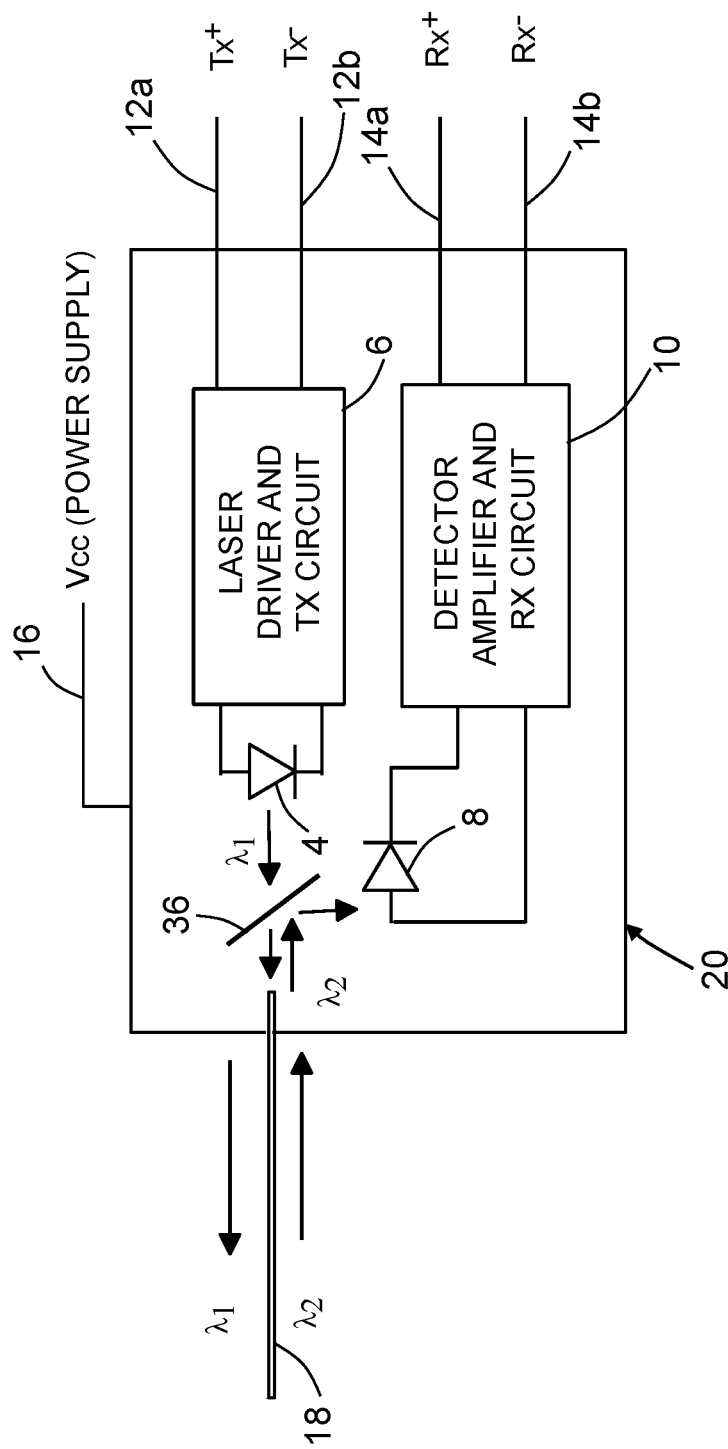
FIG. 4 is a diagram identifying some features of a single-fiber bidirectional transceiver design in which the transceiver transmits light having a first wavelength and receives light having a second wavelength different than the first wavelength.

FIG. 4 is a diagram identifying some features of a single-fiber full-duplex bidirectional transceiver design in which the dual-wavelength single-fiber bidirectional transceiver 20 transmits light having a first wavelength $\lambda_1$ and receives light having a second wavelength $\lambda_2$ different than the first wavelength $\lambda_1$ via the same glass optical fiber 18. The dual-wavelength single-fiber bidirectional transceiver 20 comprises a laser 4 and a photodetector 8. The laser 4 is driven to emit light of a wavelength $\lambda_1$ by a laser driver and transmit circuit 6 in response to receipt of differential transmit signals Tx$^+$ and Tx$^-$ from an associated line replaceable unit (not shown) via transmit electrical signal lines 12a and 12b respectively. The laser drive and transmit circuit 6 comprises electrical circuitry that converts those electrical differential signals to electrical digital signals representing the data to be transmitted by the laser 4. Conversely, the photodetector 8 receives light of wavelength $\lambda_2$ and converts that detected light into electrical digital signals which are provided to a detector amplifier and receive circuit 10. The detector amplifier and receive circuit 10 in turn comprises electrical circuitry that converts those electrical digital signals to electrical differential receive signals Rx$^+$ and Rx$^-$ representing the data received. The electrical differential receive signals Rx$^+$ and Rx$^-$ are transmitted to other circuitry in the line replaceable unit via receive electrical signal lines 14a and 14b respectively.

The dual-wavelength single-fiber bidirectional transceiver 20 depicted in FIG. 4 is capable of single-fiber operation because it is equipped in its optical front end with a wavelength-division multiplexing (WDM) filter 36 (hereinafter "WDM filter 36") which passes the optical signal from the laser 4 at one wavelength $\lambda_1$ and reflects the received optical signal at a different wavelength $\lambda_2$ toward the photodetector 8. The WDM filter 36 inside of the dual-wavelength single-fiber bidirectional transceiver 20 is a wavelength-selective bandpass filter designed in accordance with a high cross-talk isolation technique. Use of such isolation ensures that the optical signal from the local laser 4 is not detected by the receiver in the same bidirectional transceiver.

Figure 5:
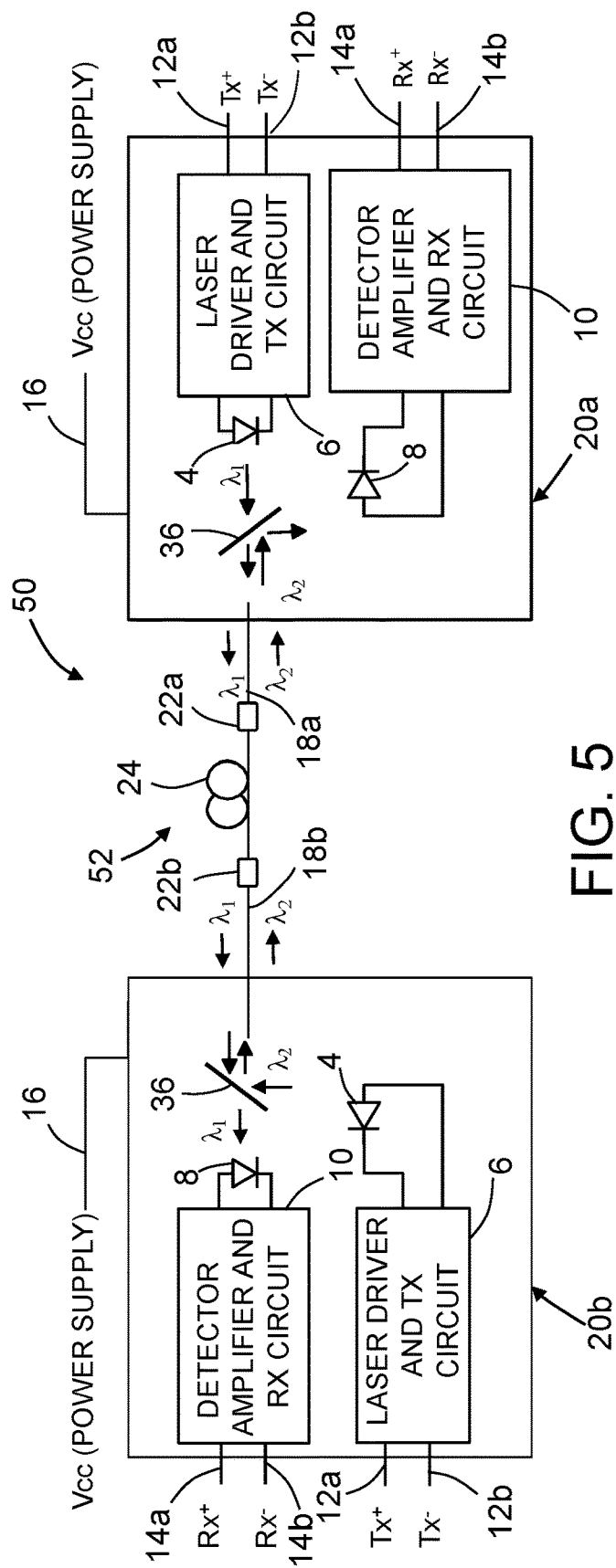
FIG. 5 is a diagram identifying some features of a bidirectional full-duplex data transmission system comprising one pair of dual-wavelength single-fiber bidirectional transceivers, each dual-wavelength single-fiber bidirectional transceivers being of the type depicted in FIG. 4.

FIG. 5 is a diagram identifying some features of a bidirectional full-duplex data transmission system 50 comprising one pair of dual-wavelength single-fiber bidirectional transceivers 20a and 20b, each dual-wavelength single-fiber bidirectional transceiver 20a and 20b being of the type depicted in FIG. 4. In this example, the laser 4 of the dual-wavelength single-fiber bidirectional transceiver 20a is optically coupled to emit light toward the photodetector 8 of the dual-wavelength single-fiber bidirectional transceiver 20b via an optical cable 52 comprising a glass optical fiber 18a, a connector 22a, a gigabit plastic optical fiber 24, a connector 22b and a glass optical fiber 18b connected in series. The laser 4 of the dual-wavelength single-fiber bidirectional transceiver 20b is optically coupled to emit light toward to the photodetector 8 of the dual-wavelength single-fiber bidirectional transceiver 20a via the same optical cable 52. The dual-wavelength single-fiber bidirectional transceiver 20a transmits light having a wavelength $\lambda_1$ and receives light having a wavelength receives $\lambda_2$. Conversely, the dual-wavelength single-fiber bidirectional transceiver 20b transmits light having a wavelength $\lambda_2$ and receives light having a wavelength receives $\lambda_1$. Each of the dual-wavelength single-fiber bidirectional transceivers 20a and 20b comprises a WMD optical filter 36 that passes light having a wavelength $\lambda_1$ and reflects light having a wavelength $\lambda_2$. The bidirectional full-duplex data transmission system 50 depicted in FIG. 5 is capable of transmitting data at a rate greater than 1 Gbits/sec in either direction due to the presence of gigabit plastic optical fiber 24 in the optical cable 52.

Figure 6:
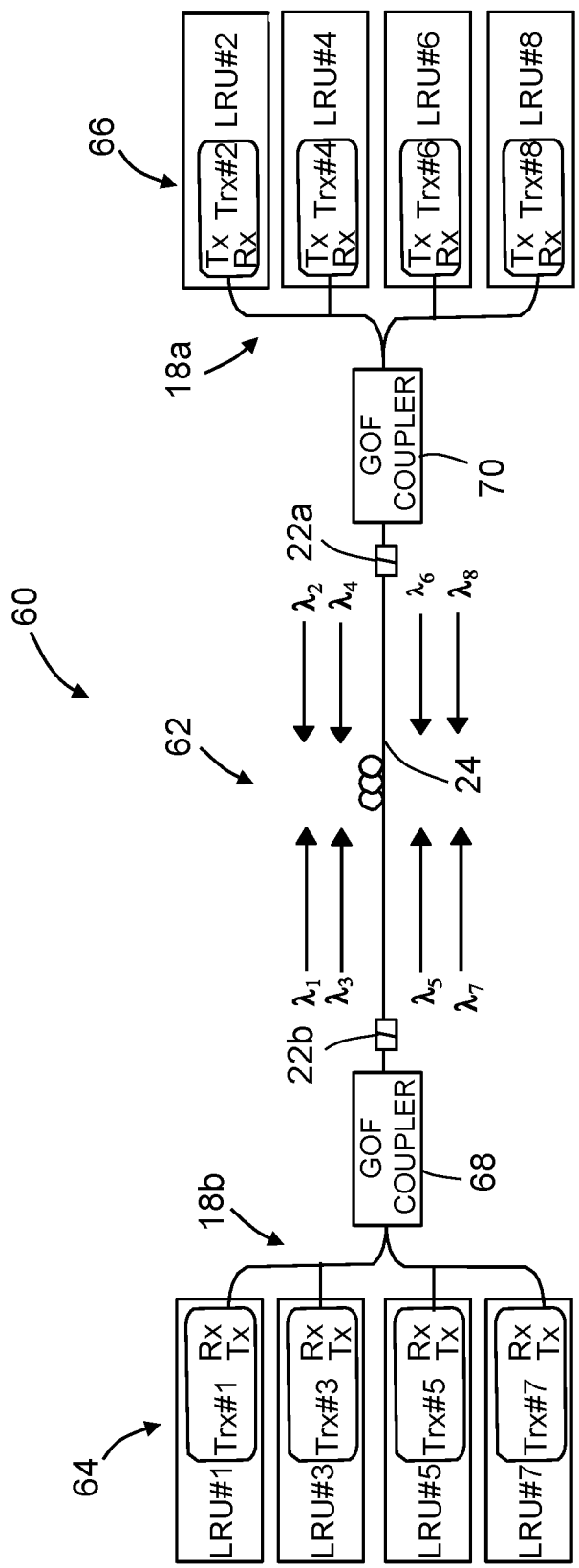
FIG. 6 is a diagram identifying components of a bidirectional full-duplex data transmission system having one full-duplex optical cable connecting the dual-wavelength single-fiber bidirectional transceivers of one set of line replaceable units to the dual-wavelength single-fiber bidirectional transceivers of another set of line replaceable units, each dual-wavelength single-fiber bidirectional transceiver transmitting light at a different wavelength.

FIG. 6 shows the replacement of the fiber optical network connections depicted in FIG. 3 using four pairs of bidirectional transceivers Trx#1-Trx#8 (of the type depicted in FIG. 4) with an optical cable 62 comprising a gigabit plastic optical fiber 24. This network configuration reduces the cables in the airplane by a factor of eight without adversely affecting the operation of the airplane LRU communications. This results in a large reduction in cost and labor for the airplane installation in the factory.

More specifically, FIG. 6 is a diagram identifying components of a bidirectional full-duplex data transmission system 60 having one full-duplex optical cable 62 for optically coupling four dual-wavelength single-fiber bidirectional transceivers Trx#1, Trx#3, Trx#5 and Trx#7 of one LRU set 64 of line replaceable units LRU#1, LRU#3, LRU#5 and LRU#7 to four dual-wavelength single-fiber bidirectional transceivers Trx#2, Trx#4, Trx#6 and Trx#8 of another LRU set 66 of line replaceable units LRU#2, LRU#4, LRU#6 and LRU#8. The eight dual-wavelength single-fiber bidirectional transceivers Trx#1-Trx#8 transmit light having different wavelengths $\lambda_1$ to $\lambda_8$.

In accordance with one embodiment, the bidirectional full-duplex data transmission system 60 comprises a first set of four glass optical fibers 18a, a first glass optical fiber coupler 70 connected to the first set of four glass optical fibers 18a, a second set of four glass optical fibers 18b and a second glass optical fiber coupler 68 connected to the second set of four glass optical fibers 18a. The four glass optical fibers 18b optically couple the glass optical fiber coupler 70 to the dual-wavelength single-fiber bidirectional transceivers Trx#2, Trx#4, Trx#6 and Trx#8, while the four glass optical fibers 18b optically couple the glass optical fiber coupler 68 to the dual-wavelength single-fiber bidirectional transceivers Trx#1, Trx#3, Trx#5 and Trx#7. The bidirectional full-duplex data transmission system 60 further comprises a gigabit plastic optical fiber 24 having one end connected to glass optical fiber coupler 70 by a connector 22a and another end connected to glass optical fiber coupler 68 by a connector 22b.

In the example depicted in FIG. 6, the laser 4 of the dual-wavelength single-fiber bidirectional transceiver Trx#1 is optically coupled to emit light having a wavelength $\lambda_1$ toward the photodetector 8 of the dual-wavelength single-fiber bidirectional transceiver Trx#2, while the laser 4 of the dual-wavelength single-fiber bidirectional transceiver Trx#2 is optically coupled to emit light having a wavelength $\lambda_2$ toward the photodetector 8 of the dual-wavelength single-fiber bidirectional transceiver Trx#1. Similarly, the laser 4 of the dual-wavelength single-fiber bidirectional transceiver Trx#3 is optically coupled to emit light having a wavelength $\lambda_3$ toward the photodetector 8 of the dual-wavelength single-fiber bidirectional transceiver Trx#4, while the laser 4 of the dual-wavelength single-fiber bidirectional transceiver Trx#4 is optically coupled to emit light having a wavelength $\lambda_4$ toward the photodetector 8 of the dual-wavelength single-fiber bidirectional transceiver Trx#3; the laser 4 of the dual-wavelength single-fiber bidirectional transceiver Trx#5 is optically coupled to emit light having a wavelength $\lambda_5$ toward the photodetector 8 of the dual-wavelength single-fiber bidirectional transceiver Trx#6, while the laser 4 of the dual-wavelength single-fiber bidirectional transceiver Trx#6 is optically coupled to emit light having a wavelength $\lambda_6$ toward the photodetector 8 of the dual-wavelength single-fiber bidirectional transceiver Trx#5; and the laser 4 of the dual-wavelength single-fiber bidirectional transceiver Trx#7 is optically coupled to emit light having a wavelength $\lambda_7$ toward the photodetector 8 of the dual-wavelength single-fiber bidirectional transceiver Trx#8, while the laser 4 of the dual-wavelength single-fiber bidirectional transceiver Trx#8 is optically coupled to emit light having a wavelength $\lambda_8$ toward the photodetector 8 of the dual-wavelength single-fiber bidirectional transceiver Trx#7. All of these optical couplings are accomplished by means of the single optical cable 62.

Each pair of optically coupled dual-wavelength single-fiber bidirectional transceivers Trx#1 through Trx#8 seen in FIG. 6 comprises a respective WMD optical filter (not shown in FIG. 6) of the type depicted in FIG. 4, except that the WMD optical filters for the respective pairs of transceivers are configured differently for each pair. For example, the WMD optical filters inside dual-wavelength single-fiber bidirectional transceivers Trx#1 and Trx#2 are designed to pass light of wavelength $\lambda_1$ and reflect light of wavelength $\lambda_2$, while the WMD optical filters inside dual-wavelength single-fiber bidirectional transceivers Trx#3 and Trx#4 are designed to pass light of wavelength $\lambda_3$ and reflect light of wavelength/$\lambda_4$, and so forth. The bidirectional full-duplex data transmission system 60 depicted in FIG. 6 is capable of transmitting data at a rate greater than 1 Gbits/sec in either direction due to the presence of gigabit plastic optical fiber 24 in the optical cable 62.

Figure 7:
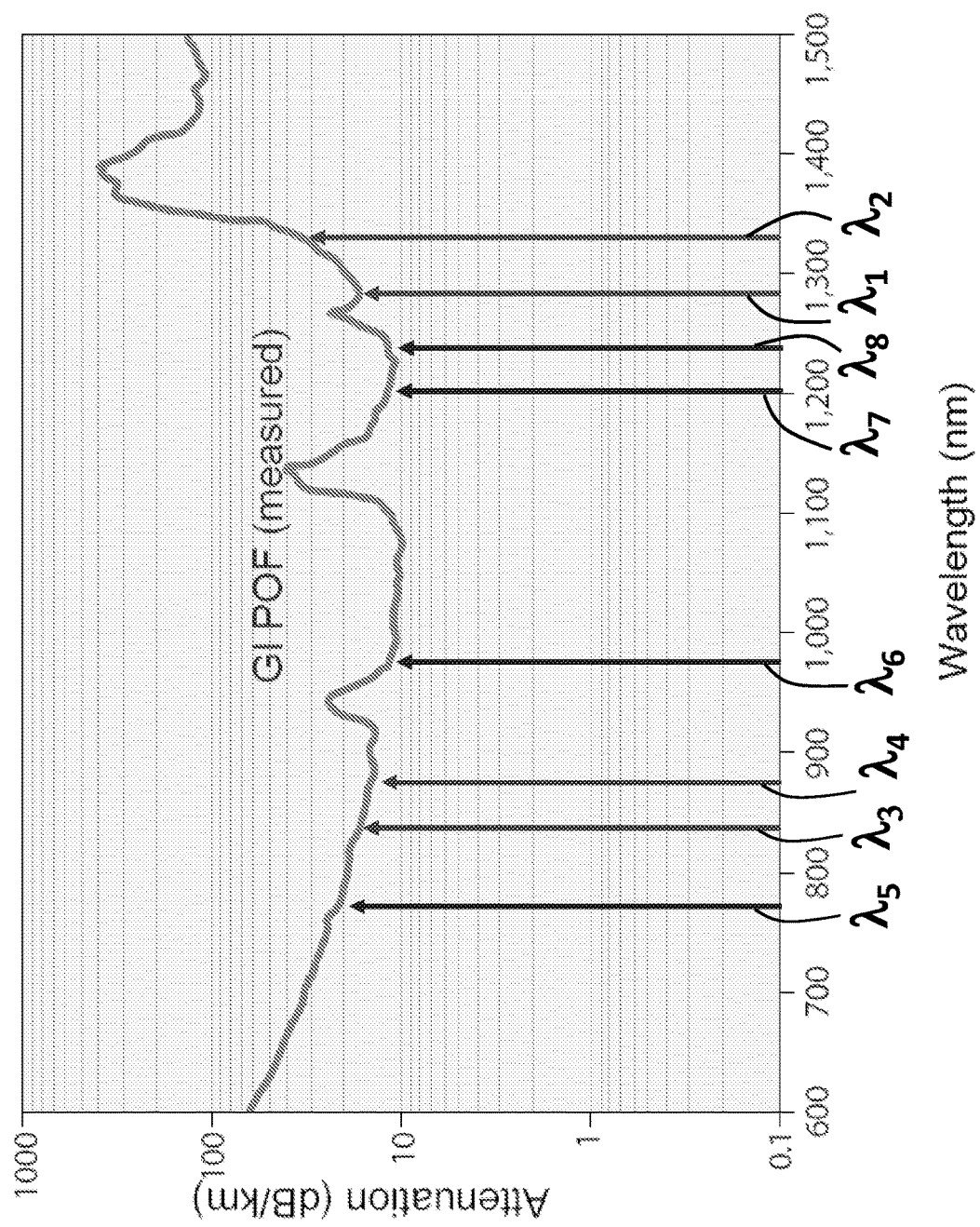
FIG. 7 is a graph showing the attenuation spectrum for a known gigabit plastic optical fiber material.

The wavelengths $\lambda_1$ to $\lambda_8$ are selected to minimize attenuation in the gigabit plastic optical fiber 24. For a given material, the attenuation of the optical signal as it passes through the optical fiber will vary as a function of the wavelength of the optical signal. Moreover, each optical fiber material has a characteristic function representing the attenuation versus wavelength. For example, one plastic optical fiber material that has proven to be suitable for Gigabit Ethernet (GbE) data transmission is perfluorinated polymer having a graded index of refraction and having a high data transmission rate over a wide wavelength range. More specifically, the gigabit plastic optical fiber 24 may be Fontex® plastic optical fiber commercially available from Asahi Glass Co., Ltd., Tokyo, Japan. FIG. 7 is a graph showing the attenuation spectrum for this graded-index plastic optical fiber material. As seen in FIG. 7, the attenuation is lowest in the range of 750 nm to 1350 nm. Other suitable gigabit plastic optical fiber materials having a range of wavelengths where attenuation is acceptable can be utilized. In any case, the wavelengths $\lambda_1$ through $\lambda_8$ are selected from the range of wavelengths where attenuation is relatively low compared to the attenuation at other wavelengths.

In accordance with one embodiment of the system depicted in FIG. 6 in which Fontex® plastic optical fiber is utilized, the respective wavelengths are the following: $\lambda_1$=1270 nm; $\lambda_2$=1330 nm; $\lambda_3$=850 nm; $\lambda_4$=880 nm; $\lambda_5$=780 nm; $\lambda_6$=980 nm; $\lambda_7$=1200 nm; and $\lambda_8$=1230 nm. Using these wavelengths provides a low optical loss in the gigabit plastic optical fiber 24 and supports a gigabit plastic optical fiber link of 100 meters or more. These wavelength selections also eliminate inter-channel cross-talk between the bidirectional transceivers because there is no overlapping wavelength region in these four pairs of wavelengths. The internal WDM filters in the bidirectional transceivers filter out the transmitter signal from the other bidirectional transceiver pairs with different wavelengths.

The laser 4 in the transmitters of the bidirectional transceivers can be implemented with single-mode distributed feedback lasers, multi-mode Fabry-Perot lasers or vertical cavity surface-emitting lasers for high optical output power and low modal noise.

The photodetector 8 in the receivers of the bidirectional transceivers can be implemented with a high-responsivity p-type intrinsic n-type (PIN) photodiode or an avalanche photodiode to provide high receiver sensitivity.

In accordance with one embodiment, each of the glass optical fiber couplers 68 and 70 shown in FIG. 6 comprises a 4×1 mode-independent multi-mode optical coupler (formed by heat fusing glass) that optically couples a respective set of four bidirectional transceivers to the opposing ends of the gigabit plastic optical fiber 24. The advantages of a mode-independent optical coupler are: (1) it has an optical output splitting ratio independent of the input optical mode from the transmitter's laser source; and (2) the mode-independent optical coupler has optical reflection lower than −40 dB to reduce the optical signal reflected from the adjacent bidirectional transceiver. Respective ultra-low-reflection connectors 18*a* and 18*b* are used to connect the outputs of the glass optical fiber couplers 68 and 70 to the opposing ends of the gigabit plastic optical fiber 24. For example, the end face of the glass optical fiber on one side of the glass optical fiber couplers and the confronting end face of the gigabit plastic optical fiber 24 are angles and polished. The ultra-low-reflection connectors 18*a* and 18*b* are formed with a small angle at those end faces.

Due to the long length of some of the fiber optical paths connecting transceivers in the forward section of an airplane to transceivers in the aft section of the airplane, it is common to use connectors to optically couple a plurality of shorter-length optical fibers in series. Many different types of optical fiber connectors exist and are commercially available. Accordingly, FIG. 6 does not seek to depict any particular configuration or type of optical fiber connector. Each of the connectors 22*a* and 22*b* may have a generally circular cylindrical structure. In addition, it is well known that some connectors include springs and associated structure for pushing the ends of two fiber optic devices into contact with each other. Such springs and associated structure are also not shown in FIG. 6.

The connector's optical coupling loss depends on the quality of the confronting (e.g., abutting) end faces of each glass optical fiber coupler 68 or 70 and gigabit plastic optical fiber 24. A poor end face can introduce an additional optical loss per connector. The provision of smooth optical fiber end faces is important to reduce the connector's optical coupling loss for avionics networks where the optical cable's power budget is very tight due to relatively long optical cable lengths.

Although the embodiment depicted in FIG. 6 comprises a forward set of four line replaceable units optically communicating with an aft set of four line replaceable units on an airplane, the concepts disclosed herein may be applied in situations where the number of line replaceable units in each of the forward and aft sets is different than four, for example, as few as two and perhaps as many as sixteen if the resulting optical losses are acceptable.

Figure 8:
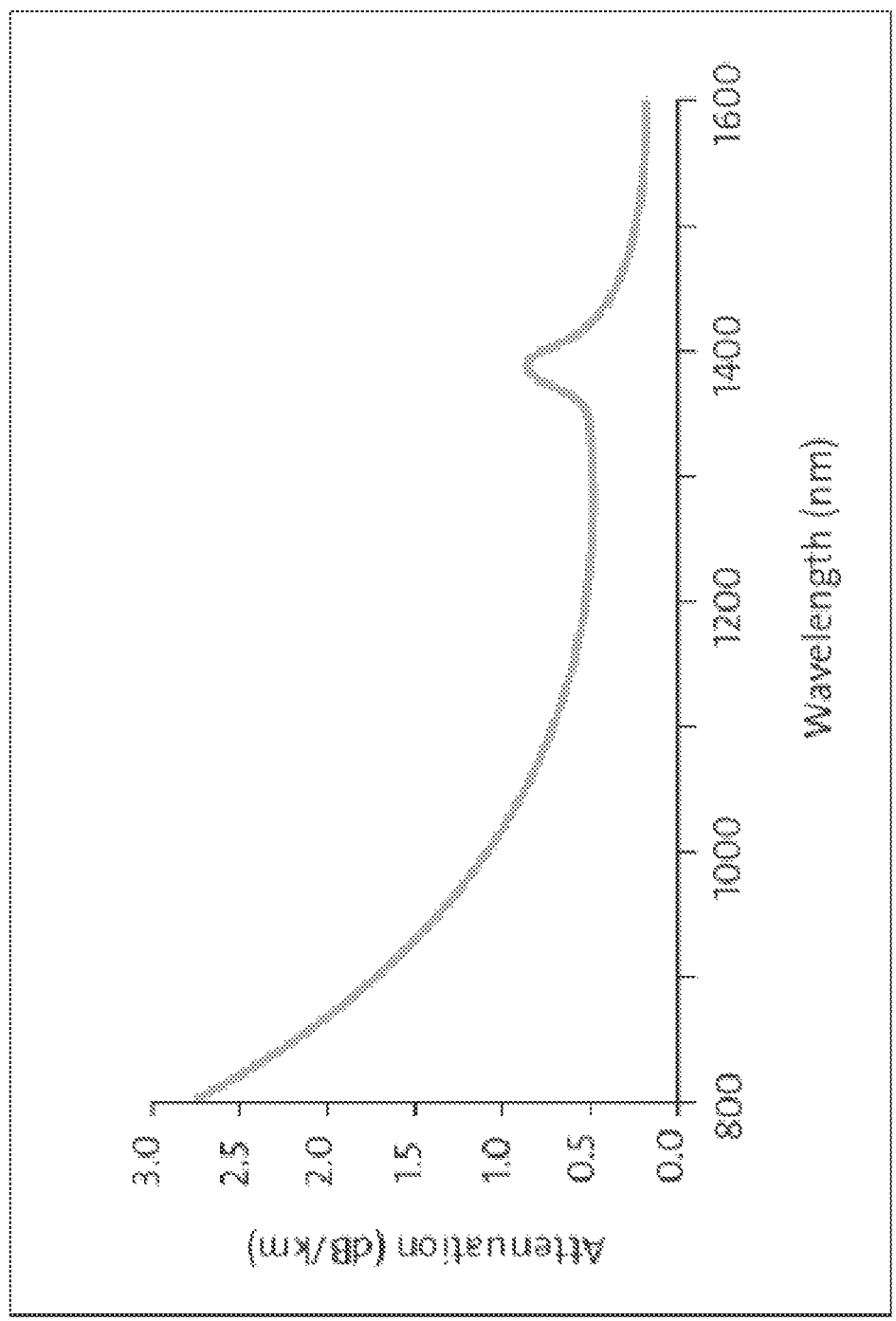
FIG. 8 is a graph showing the attenuation spectrum for a known gigabit glass optical fiber material.

The system described above may in the alternative be implemented using all glass optical fiber. The use of GbPOF is a special application (or solution) where glass fiber is a problem for airplane installation. But for many long-distance terrestrial, data center and fiber-to-the-home/office applications (non-aerospace), glass optical fiber installation is not a major problem. As shown in FIG. 8, for glass optical fiber, the minimum loss region lies in a range of wavelengths from 1350 nm to 1600 nm. Example wavelength pairs for glass optical fiber implementation are: 1365 and 1460 nm; 1465 and 1550 nm; 1530 and 1560 nm; 1565 and 1600 nm, and many other possible selections. The embodiments depicted in FIGS. 5 and 6 can be implemented with GOF for non-aerospace systems by choosing a wavelength range where the optical loss for the particular GOF is low. GbGOF and GbPOF have different optical loss characteristics which vary with wavelength as shown in FIGS. 7 and 8.

In summary, an avionics system may comprise multiple bidirectional transceivers configured to transmit and receive proper wavelengths that correspond to the optical loss minimum for the particular gigabit plastic or glass optical fiber being employed. The design disclosed herein enables the use of long gigabit plastic optical fiber links (100 meters or longer) in medium- and large-sized airplanes. The configuration disclosed herein reduces the fiber count in the airplane by a factor of eight for the specific example wherein one set of four bidirectional transceivers respectively communicates with four bidirectional transceivers in a corresponding set. The fiber count reduction factor will be a function of how many bidirectional transceivers are optically coupled in pairs by a single gigabit plastic or glass optical fiber. The reduced fiber count reduces weight, size and installation cost of fiber cables in the airplane. It also reduces the power consumption in the LRU system by using multiple bidirectional transceivers. Also the use of gigabit plastic optical fiber enables the use of a single-wavelength distributed feedback laser without modal noise issues. The resulting data transmission system is capable of full-duplex or half-duplex communication between LRUs with a single fiber link.

While optical networking systems have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. A data transmission system comprising:
   first through fourth glass optical fibers;
   a first multi-mode glass optical fiber coupler connected to the first and third glass optical fibers;
   a second multi-mode glass optical fiber coupler connected to the second and fourth glass optical fibers;
   a multi-mode gigabit optical fiber having one end connected to the first multi-mode glass optical fiber coupler and another end connected to the second multi-mode glass optical fiber coupler; and
   first through fourth transceivers each comprising an optical filter, a laser disposed to transmit light toward the optical filter, and a photodetector disposed to receive light from the optical filter, wherein:
   the laser and photodetector of the first transceiver are optically coupled to the first glass optical fiber, the photodetector and laser of the second transceiver are optically coupled to the second glass optical fiber, the laser and photodetector of the third transceiver are optically coupled to the third glass optical fiber, and the photodetector and laser of the fourth transceiver are optically coupled to the fourth glass optical fiber;
   the laser of the first transceiver emits light having a first wavelength, the laser of the second transceiver emits light having a second wavelength, the laser of the third transceiver emits light having a third wavelength, and the laser of the fourth transceiver emits light having a fourth wavelength; and
   the optical filters of the first and second transceivers pass light having the first wavelength and reflect light having the second wavelength, and the optical filters of the third and fourth transceivers pass light having the third wavelength and reflect light having the fourth wavelength.

2. The data transmission system as recited in claim 1, wherein the first through fourth wavelengths are in a range from 750 nm to 1600 nm.

3. The data transmission system as recited in claim 1, wherein the first wavelength is 1270 nm, the second wavelength is 1330 nm, the third wavelength is 850 nm and the fourth wavelength is 880 nm.

4. The data transmission system as recited in claim 1, further comprising:
   fifth through eighth glass optical fibers, the fifth and seventh glass optical fibers being connected to the first multi-mode glass optical fiber coupler, and the sixth and eighth glass optical fibers being connected to the second multi-mode glass optical fiber coupler;
   fifth through eighth transceivers each comprising an optical filter, a laser disposed to transmit light toward the optical filter, and a photodetector disposed to receive light from the optical filter, wherein:
   the laser and photodetector of the fifth transceiver are optically coupled to the fifth glass optical fiber, the photodetector and laser of the sixth transceiver are optically coupled to the sixth glass optical fiber, the laser and photodetector of the seventh transceiver are optically coupled to the seventh glass optical fiber, and the photodetector and laser of the eighth transceiver are optically coupled to the eighth glass optical fiber;
   the laser of the fifth transceiver emits light having a fifth wavelength, the laser of the sixth transceiver emits light having a sixth wavelength, the laser of the seventh transceiver emits light having a seventh wavelength, and the laser of the eighth transceiver emits light having an eighth wavelength; and
   the optical filters of the fifth and sixth transceivers pass light having the fifth wavelength and reflect light having the sixth wavelength, and the optical filters of the seventh and eighth transceivers pass light having the seventh wavelength and reflect light having the eighth wavelength.

5. The data transmission system as recited in claim 4, wherein the first through eighth wavelengths are in a range of 750 nm to 1600 nm.

6. The data transmission system as recited in claim 5, wherein the first wavelength is 1270 nm, the second wavelength is 1330 nm, the third wavelength is 850 nm, the fourth wavelength is 880 nm, the fifth wavelength is 780 nm, the sixth wavelength is 980 nm, the seventh wavelength is 1200 nm and the eighth wavelength is 1230 nm.

7. The data transmission system as recited in claim 1, wherein each optical filter of the first through fourth transceivers is a wavelength-selective bandpass filter.

8. The data transmission system as recited in claim 1, wherein each of the first through fourth transceivers is a dual-wavelength single-fiber bidirectional transceiver.

9. A method for enabling bidirectional full-duplex data transmission between line replaceable units, comprising:
   (a) equipping first through fourth line replaceable units with first through fourth dual-wavelength single-fiber bidirectional transceivers respectively wherein each transceiver comprises a respective laser, a respective photodetector and a respective optical filter arranged and configured to transmit light having one wavelength and to reflect light having a different wavelength, wherein the laser of the first dual-wavelength single-fiber bidirectional transceiver emits light having a first wavelength, the laser of the second dual-wavelength single-fiber bidirectional transceiver emits light having a second wavelength, the laser of the third dual-wavelength single-fiber bidirectional transceiver emits light having a third wavelength, and the laser of the fourth dual-wavelength single-fiber bidirectional transceiver emits light having a fourth wavelength, and wherein the optical filters of the first and second dual-wavelength single-fiber bidirectional transceivers pass light having the first wavelength and reflect light having the second wavelength, and the optical filters of the third and fourth dual-wavelength single-fiber bidirectional transceivers pass light having the third wavelength and reflect light having the fourth wavelength;
   (b) using respective optical fibers to connect the first and third dual-wavelength single-fiber bidirectional transceivers to a first multi-mode glass optical coupler;
   (c) using respective optical fibers to connect the second and fourth dual-wavelength single-fiber bidirectional transceivers to a second multi-mode glass optical coupler; and (d) connecting the first and second multi-mode glass optical couplers to opposite ends of a multi-mode gigabit optical fiber.

10. The method as recited in claim 9, wherein the first through fourth wavelengths are in a range from 750 nm to 1600 nm.

11. The method as recited in claim 9, further comprising:
equipping a fifth line replaceable unit with a fifth dual-wavelength single-fiber bidirectional transceiver that emits light having a fifth wavelength and detects light having a sixth wavelength;
equipping a sixth line replaceable unit with a sixth dual-wavelength single-fiber bidirectional transceiver that emits light having the sixth wavelength and detects light having the fifth wavelength;
equipping a seventh line replaceable unit with a seventh dual-wavelength single-fiber bidirectional transceiver that emits light having a seventh wavelength and detects light having an eighth wavelength;
equipping a eighth line replaceable unit with an eighth dual-wavelength single-fiber bidirectional transceiver that emits light having the eighth wavelength and detects light having the seventh wavelength;
using respective optical fibers to connect the fifth and seventh dual-wavelength single-fiber bidirectional transceivers to the first multi-mode glass optical coupler; and
using respective optical fibers to connect the sixth and eighth dual-wavelength single-fiber bidirectional transceivers to the second multi-mode glass optical coupler.

12. The method as recited in claim 11, wherein the first through eighth wavelengths are in a range of 750 nm to 1600 nm.

13. The method as recited in claim 11, wherein the first wavelength is 1270 nm, the second wavelength is 1330 nm, the third wavelength is 850 nm, the fourth wavelength is 880 nm, the fifth wavelength is 780 nm, the sixth wavelength is 980 nm, the seventh wavelength is 1200 nm and the eighth wavelength is 1230 nm.

14. A data communications system comprising:
first and second pluralities of electrical devices configured for sending and receiving electrical signals representing data;
a first plurality of dual-wavelength single-fiber bidirectional transceivers, each dual-wavelength single-fiber bidirectional transceiver of the first plurality comprising a respective transmit circuit that converts electrical signals received from a respective one of the first plurality of electrical devices into optical signals and a respective receive circuit that converts optical signals into electrical signals to be sent to the respective one of the first plurality of electrical devices;
a second plurality of dual-wavelength single-fiber bidirectional transceivers, each dual-wavelength single-fiber bidirectional transceiver of the second plurality comprising a respective transmit circuit that converts electrical signals received from a respective one of the second plurality of electrical devices into optical signals and a respective receive circuit that converts optical signals into electrical signals to be sent to the respective one of the second plurality of electrical devices;
a first multi-mode glass optical fiber coupler connected to a single fiber of each of the first plurality of dual-wavelength single-fiber bidirectional transceivers;
a second multi-mode glass optical fiber coupler connected to a single fiber of each of the second plurality of dual-wavelength single-fiber bidirectional transceivers; and
a multi-mode gigabit optical fiber connecting the first multi-mode glass optical fiber coupler to the second multi-mode glass optical fiber coupler, wherein:
a first dual-wavelength single-fiber bidirectional transceiver of the first plurality of dual-wavelength single-fiber bidirectional transceivers emits light having a first wavelength and detects light having a second wavelength using a first optical filter that passes light having the first wavelength and reflects light having the second wavelength;
a second dual-wavelength single-fiber bidirectional transceiver of the second plurality of dual-wavelength single-fiber bidirectional transceivers emits light having the second wavelength and detects light having the first wavelength using a second optical filter that passes light having the first wavelength and reflects light having the second wavelength;
a third dual-wavelength single-fiber bidirectional transceiver of the first plurality of dual-wavelength single-fiber bidirectional transceivers emits light having a third wavelength and detects light having a fourth wavelength using a third optical filter that passes light having the third wavelength and reflects light having the fourth wavelength;
a fourth dual-wavelength single-fiber bidirectional transceiver of the second plurality of dual-wavelength single-fiber bidirectional transceivers emits light having the fourth wavelength and detects light having the third wavelength using a fourth optical filter that passes light having the third wavelength and reflects light having the fourth wavelength.

15. The data communications system as recited in claim 14, wherein the first plurality of electrical devices are line replaceable units located in a forward section of an airplane and the second plurality of electrical devices are line replaceable units located in an aft section of the airplane.

16. The data communications system as recited in claim 14, wherein:
a fifth dual-wavelength single-fiber bidirectional transceiver of the first plurality of dual-wavelength single-fiber bidirectional transceivers emits light having a fifth wavelength and detects light having a sixth wavelength using a fifth optical filter that passes light having the fifth wavelength and reflects light having the sixth wavelength;
a sixth dual-wavelength single-fiber bidirectional transceiver of the second plurality of dual-wavelength single-fiber bidirectional transceivers emits light having the sixth wavelength and detects light having the fifth wavelength using a sixth optical filter that passes light having the fifth wavelength and reflects light having the sixth wavelength;
a seventh dual-wavelength single-fiber bidirectional transceiver of the first plurality of dual-wavelength single-fiber bidirectional transceivers emits light having a seventh wavelength and detects light having an eighth wavelength using a seventh optical filter that passes light having the seventh wavelength and reflects light having the eighth wavelength; and
an eighth dual-wavelength single-fiber bidirectional transceiver of the second plurality of dual-wavelength single-fiber bidirectional transceivers emits light having the eighth wavelength and detects light having the seventh wavelength using an eighth optical filter that passes light having the seventh wavelength and reflects light having the eighth wavelength, wherein the first through eighth wavelengths are different.

17. The data communications system as recited in claim 16, wherein the first wavelength is 1270 nm, the second wavelength is 1330 nm, the third wavelength is 850 nm, the fourth wavelength is 880 nm, the fifth wavelength is 780 nm, the sixth wavelength is 980 nm, the seventh wavelength is 1200 nm and the eighth wavelength is 1230 nm.

* * * * *